(12) United States Patent
Goodwill et al.

(10) Patent No.: US 8,256,155 B1
(45) Date of Patent: Sep. 4, 2012

(54) SIMULATED FOWL SWIMMING APPARATUS

(76) Inventors: Mike Goodwill, Shreveport, LA (US); David Spivey, Shreveport, LA (US)

( * ) Notice: Subject to any disclaimer, the term of this patent is extended or adjusted under 35 U.S.C. 154(b) by 83 days.

(21) Appl. No.: 12/799,766

(22) Filed: Apr. 30, 2010

(51) Int. Cl.
*A01M 31/06* (2006.01)

(52) U.S. Cl. ............................................................. 43/3

(58) Field of Classification Search ................... 43/2, 3; 40/411, 412, 421, 422, 439–441; *A01M 31/06*
See application file for complete search history.

(56) References Cited

U.S. PATENT DOCUMENTS

| | | | |
|---|---|---|---|
| 2,227,242 A * | 12/1940 | Boutin | 43/3 |
| 2,544,594 A * | 3/1951 | Goldfarb | 446/74 |
| 2,674,065 A * | 4/1954 | Sprinkle | 446/154 |
| 2,909,859 A * | 10/1959 | Christmas | 43/3 |
| 3,034,245 A * | 5/1962 | Lynch | 43/3 |
| 4,147,281 A * | 4/1979 | Missale et al. | 222/192 |
| 5,385,501 A * | 1/1995 | Fish | 446/154 |
| 5,566,491 A * | 10/1996 | Phillips | 43/3 |
| 6,088,944 A * | 7/2000 | Jones | 43/3 |
| 7,434,347 B1 * | 10/2008 | Powell | 43/3 |
| 2009/0235571 A1 * | 9/2009 | Wyant et al. | 43/2 |

* cited by examiner

*Primary Examiner* — Darren W Ark
*Assistant Examiner* — Thien Thanh Pham
(74) *Attorney, Agent, or Firm* — R. Keith Harrison (57) ABSTRACT

A simulated fowl swimming apparatus includes a pump conduit, a pump disposed in fluid communication with the pump conduit, a decoy motion assembly disposed in fluid communication with and rotatable with respect to the pump conduit, at least one discharge opening in the decoy motion assembly and at least one water fowl decoy carried by the decoy motion assembly.

14 Claims, 9 Drawing Sheets

SIMULATED FOWL SWIMMING APPARATUS

FIELD

The disclosure generally relates to decoys which simulate ducks and other water fowl. More particularly, the disclosure relates to a simulated fowl swimming apparatus having at least one water fowl decoy which simulates the movement of water fowl on a water body and accurately replicates the water trailing effect of a swimming water fowl.

BACKGROUND

Water fowl decoys are constructed typically of plastic and are sized, shaped and colored to resemble water fowl such as ducks, geese or swine, for example. The decoys are typically placed on a body of water such as a lake or pond to attract water fowl for the purpose of hunting or observation. The decoys may be tethered to a stump or other support to prevent the decoys from drifting away from the hunting or observation area.

Considerable effort is expended on rendering a water fowl decoy as authentic and lifelike as possible. In some applications, this may include imparting movement to the decoy on the surface of the water. However, the manner in which the decoy is moved on the surface of the water body may not accurately replicate the trailing effect of an actual water fowl swimming on the surface of the water. This limitation may hinder attraction of water fowl to the area in which the decoy moves on the water.

Therefore, a simulated fowl swimming apparatus having at least one water fowl decoy which simulates the movement of water fowl on a water body and accurately replicates the water trailing effect of a swimming water fowl is needed.

SUMMARY

The disclosure is generally directed to a simulated fowl swimming apparatus. An illustrative embodiment of the apparatus includes a pump conduit, a pump disposed in fluid communication with the pump conduit, a decoy motion assembly disposed in fluid communication with and rotatable with respect to the pump conduit, at least one discharge opening in the decoy motion assembly and at least one water fowl decoy carried by the decoy motion assembly.

In some embodiments, the simulated fowl swimming apparatus may include a pump conduit; a pump disposed in fluid communication with the pump conduit; and a decoy motion assembly including a connecting conduit disposed in fluid communication with and rotatable with respect to the pump conduit; at least one water distribution conduit having a water distribution conduit inlet end proximate to and disposed in fluid communication with the connecting conduit and a water distribution conduit discharge end opposite the water distribution conduit inlet end; at least one water discharge conduit having a water discharge conduit inlet end proximate to and disposed in fluid communication with the water distribution conduit discharge end of the at least one water distribution conduit and a water discharge conduit discharge end opposite the water discharge conduit inlet end; at least one discharge opening at the water discharge conduit discharge end of the at least one water discharge conduit; and at least one water fowl decoy carried by the water discharge conduit.

In some embodiments, the simulated fowl swimming apparatus may include a pump conduit having a generally elongated, cylindrical conduit wall and a first conduit end and a second conduit end opposite the first conduit end; a pump disposed in fluid communication with the pump conduit between the first conduit end and the second conduit end; a stake having a stake tip carried by the first conduit end of the pump conduit; and a decoy motion assembly including a connecting conduit disposed in fluid communication with and rotatable with respect to the second conduit end of the pump conduit; at least one water distribution conduit having a water distribution conduit inlet end proximate to and disposed in fluid communication with the connecting conduit and a water distribution conduit discharge end opposite the water distribution conduit inlet end; at least one water discharge conduit having a water discharge conduit inlet end proximate to and disposed in fluid communication with the water distribution conduit discharge end of the at least one water distribution conduit and a water discharge conduit discharge end opposite the water discharge conduit inlet end; at least one discharge opening at the water discharge conduit discharge end of the at least one water discharge conduit; and at least one water fowl decoy carried by the water discharge conduit.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
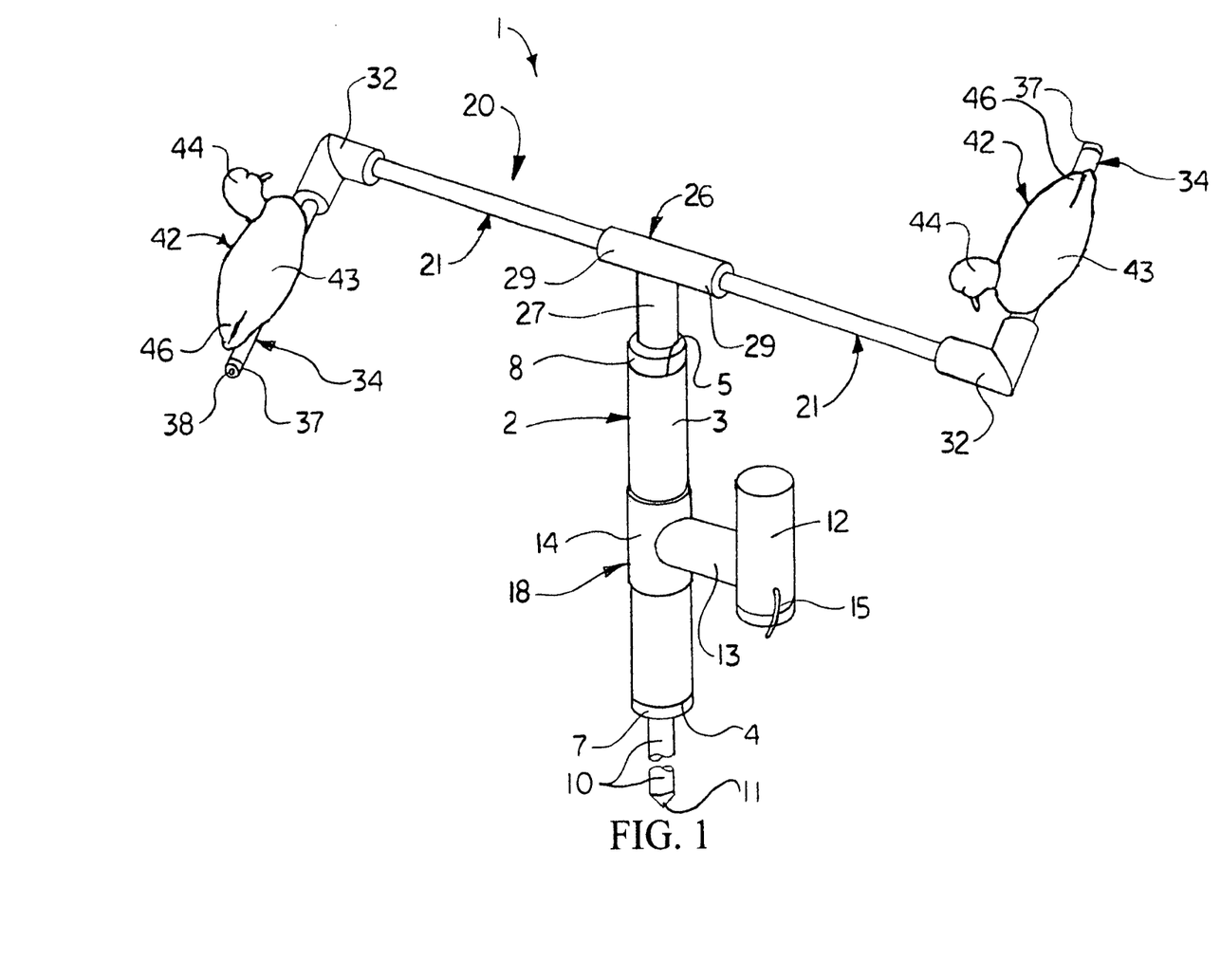
FIG. 1 is a perspective view, partially in section, of an illustrative embodiment of the simulated fowl swimming apparatus.
Figure 2:
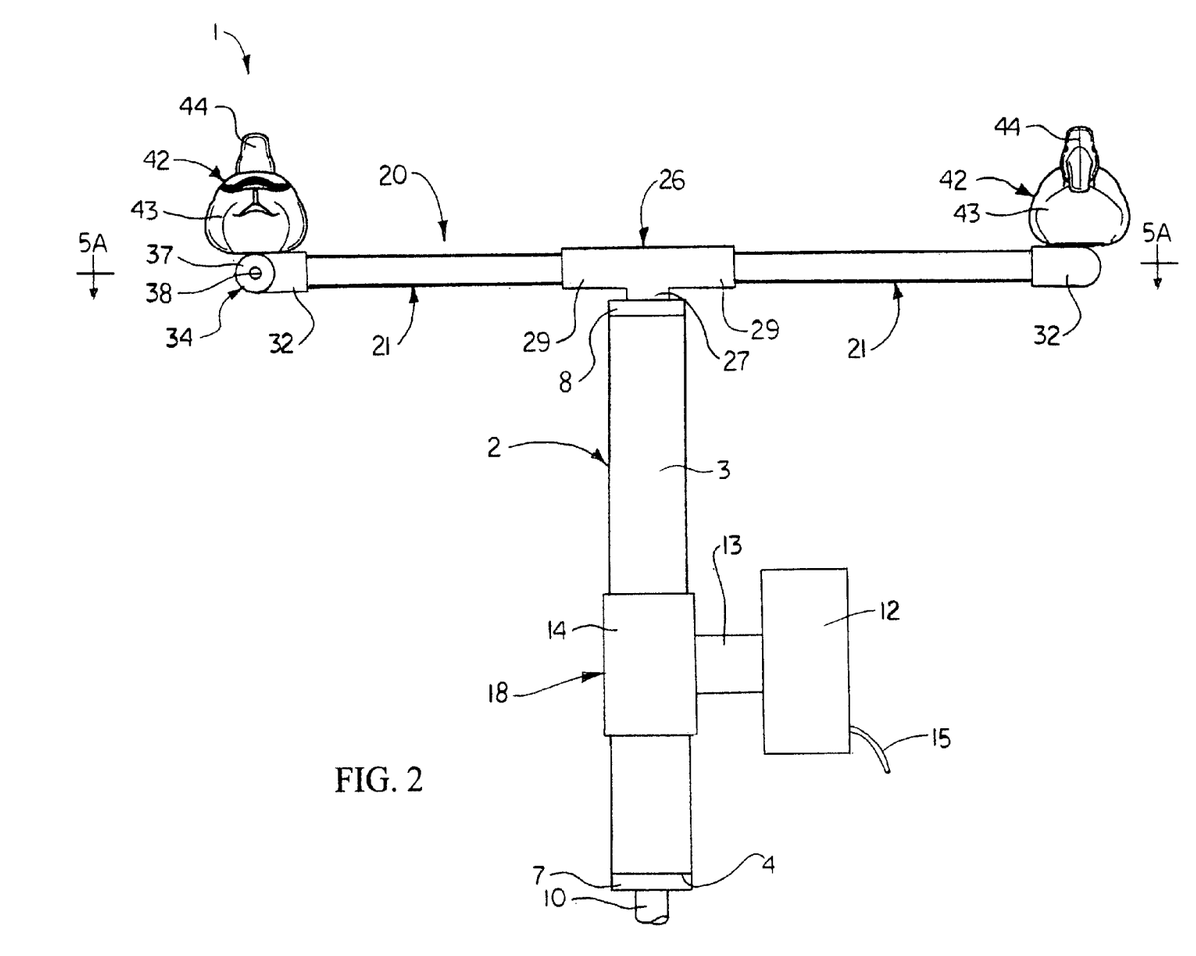
FIG. 2 is a front view, partially in section, of an illustrative embodiment of the simulated fowl swimming apparatus.
Figure 5:
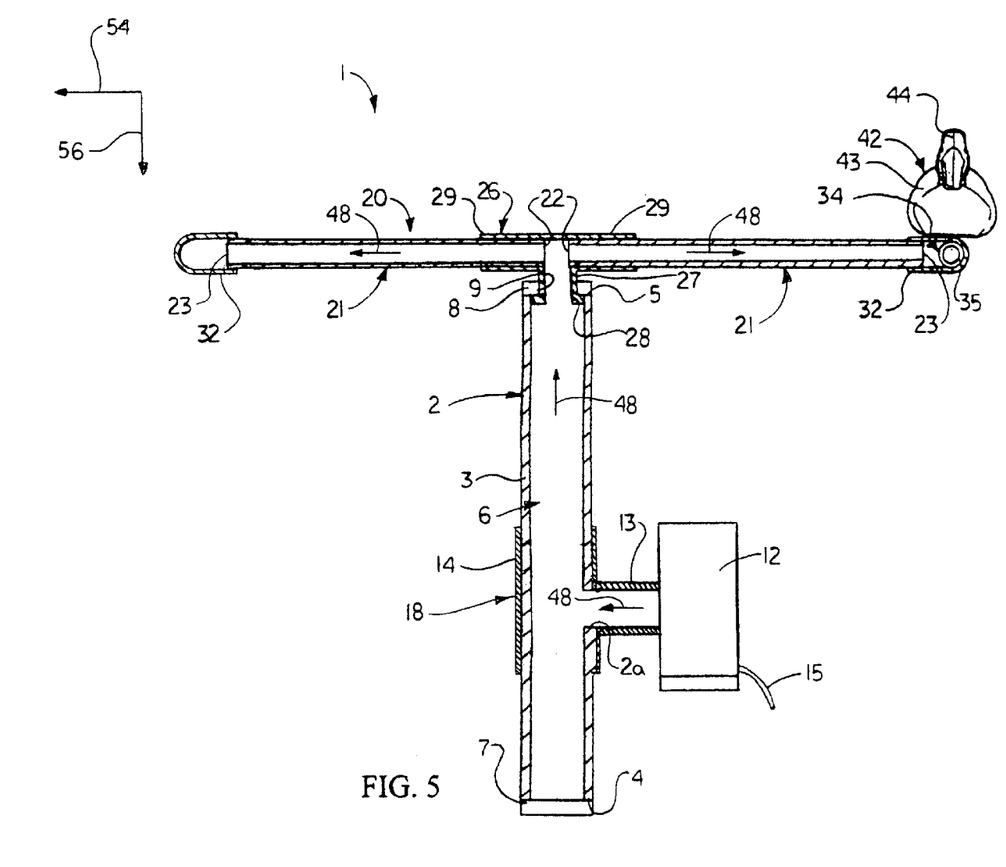
FIG. 5 is a sectional view, taken along section lines 5-5 in FIG. 3, of an illustrative embodiment of the simulated fowl swimming apparatus.

Referring initially to FIGS. 1-8 of the drawings, an illustrative embodiment of the simulated fowl swimming apparatus, hereinafter apparatus, is generally indicated by reference numeral 1. The apparatus 1 includes a pump conduit 2 having a conduit wall 3 which may have a generally elongated, cylindrical configuration. The pump conduit 2 may be polyvinyl chloride (PVC) or any other suitable conduit material. The pump conduit 2 may have a lower conduit end 4 and an upper conduit end 5 opposite the lower conduit end 4. As illustrated in FIG. 5, the pump conduit 2 has a conduit interior 6. A conduit cap 7 may close the lower conduit end 4 of the pump conduit 2. An annular bushing 8 having a bushing opening 9 (FIG. 5) may be provided on the upper conduit end 5 of the pump conduit 2. As illustrated in FIGS. 1 and 2, in some embodiments a stake 10 having a stake tip 11 (FIG. 1) may extend from the conduit cap 7 of the pump conduit 2 for purposes which will be hereinafter described.

Figure 8:
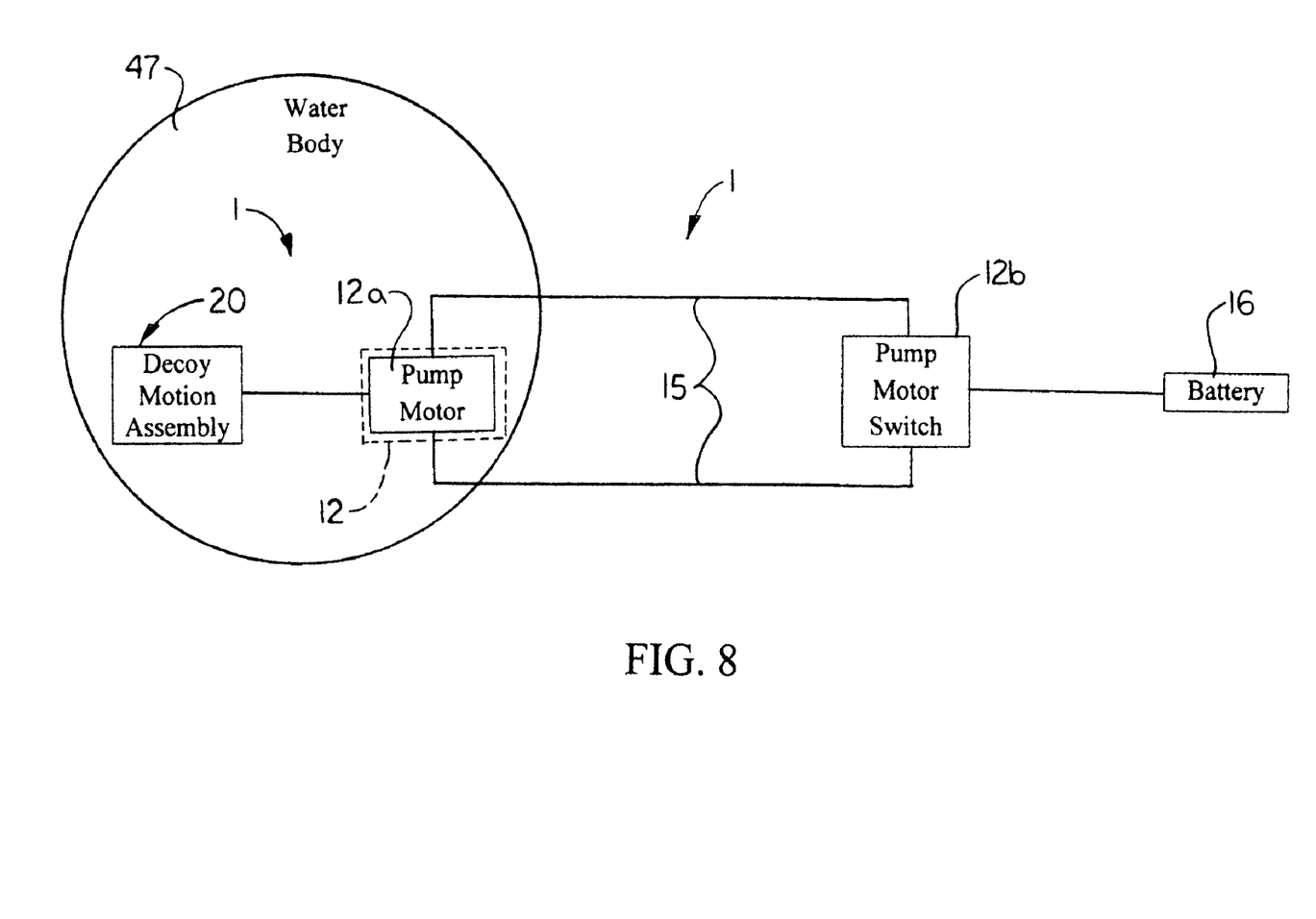
FIG. 8 is a schematic block diagram of an illustrative embodiment of the simulated fowl swimming apparatus in an exemplary application of the apparatus.

A bilge pump 12 may be disposed in fluid communication with the conduit interior 6 (FIG. 5) of the pump conduit 2. As illustrated in FIG. 5, in some embodiments the bilge pump 12 may be disposed in fluid communication with the conduit interior 6 of the pump conduit 2 through a connecting conduit 18. The connecting conduit 18 may include a connecting conduit 13 which communicates with the outlet of the bilge pump 12 through a pump opening 2a in the conduit wall 3 of the pump conduit 2. A connecting conduit sleeve 14 may be provided on the pump conduit 2 in communication with the connecting conduit 13. As illustrated in FIG. 8, the bilge pump 12 may have a pump motor 12a. A pump motor switch 12b may be electrically connected to the pump motor 12a through pump wiring 15. A battery 16 may be electrically connected to the pump motor 12a through the pump motor switch 12b. Accordingly, in operation of the apparatus 1, which will be hereinafter described, manipulation of the pump motor switch 12b facilitates operation of the pump motor 12a of the bilge pump 12. In some embodiments, the pump motor switch 12b and the battery 16 may be located at a remote position with respect to the pump motor 12a of the bilge pump 12 to facilitate remote control operation of the apparatus 1, as will be hereinafter further described.

Figure 5A:
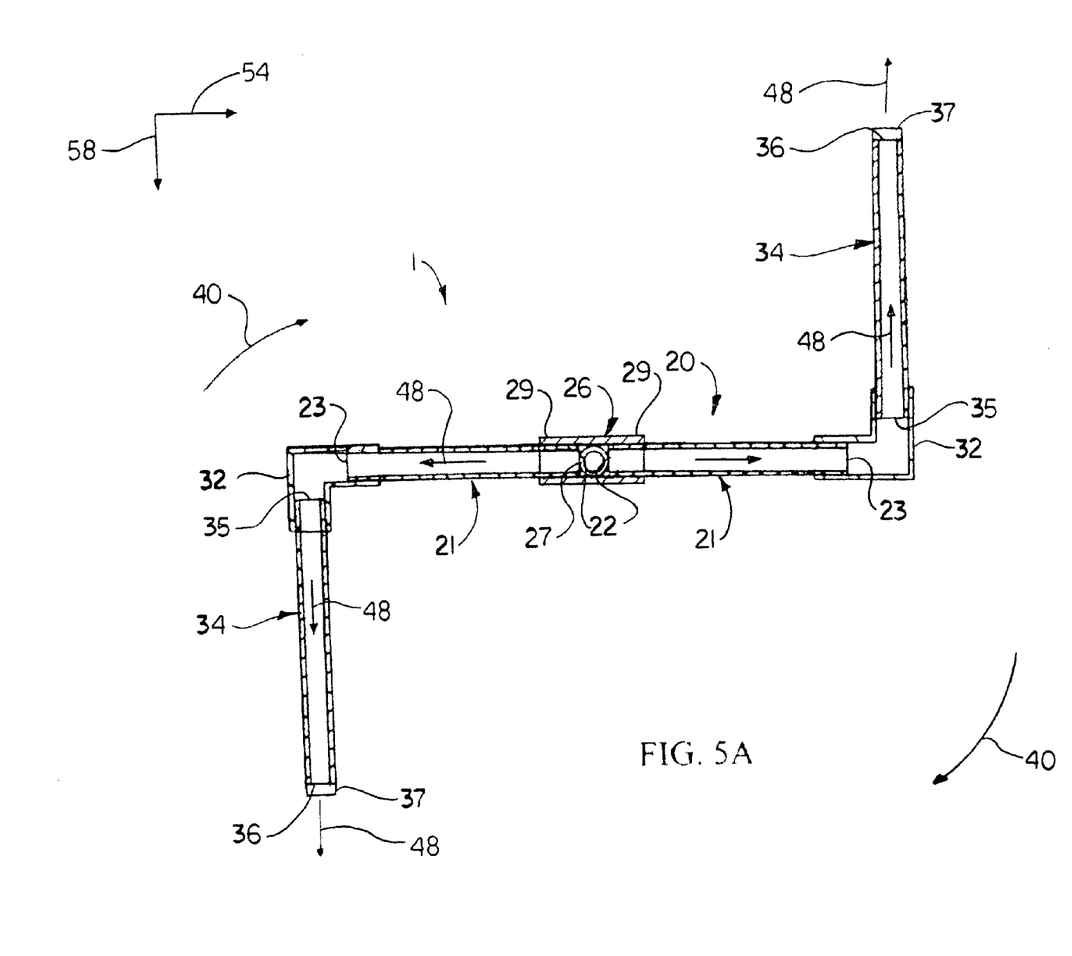
FIG. 5A is a sectional view, taken along section lines 5A-5A in FIG. 2, of an illustrative embodiment of the fowl swimming apparatus.

A decoy motion assembly 20 is provided on and rotatable with respect to the pump conduit 2. The decoy motion assembly 20 may include at least one generally elongated water distribution conduit 21 which is disposed in fluid communication with the conduit interior 6 (FIG. 5) of the pump conduit 2. Each water distribution conduit 21 may be polyvinyl chloride (PVC) or any other suitable conduit material. As illustrated in FIG. 5, each water distribution conduit 21 may include a water distribution conduit inlet end 22 which communicates with the conduit interior 6 of the pump conduit 2 and a water distribution conduit discharge end 23 which is spaced-apart from the water distribution conduit inlet end 22. A connecting conduit 26, which in some embodiments may be a tee fitting, may attach each water distribution conduit 21 to the pump conduit 2. In some embodiments, the connecting conduit 26 may include a connecting conduit neck 27 which extends through the bushing opening 9 of the bushing 8. A connecting conduit flange 28 may extend outwardly from the connecting conduit neck 27 to secure the connecting conduit neck 27 in the bushing opening 9. Therefore, the connecting conduit neck 27 of the connecting conduit 26 is rotatable in the bushing opening 9 of the bushing 8 for purposes which will be hereinafter described. At least one connecting conduit arm 29 may extend from the connecting conduit neck 27. In some embodiments, the connecting conduit arm 29 of the connecting conduit 26 may receive the water distribution conduit inlet end 22 of the water distribution conduit 21, as illustrated in FIGS. 5 and 5A. In other embodiments, the connecting conduit arm 29 of the connecting conduit 26 may be inserted into the water distribution conduit inlet end 22 of the water distribution conduit 21. In still other embodiments, the water distribution conduit 21 may be cast, molded or otherwise formed integrally with the connecting conduit arm 29 of the connecting conduit 26. As further illustrated in FIG. 5, a longitudinal axis 54 of each water distribution conduit 21 may be disposed at a generally 90-degree angle with respect to a longitudinal axis 56 of the pump conduit 2.

As illustrated in FIG. 5A, the decoy motion assembly 20 may further include at least one water discharge conduit 34 which is disposed in fluid communication with each water distribution conduit 21. Each water discharge conduit 34 may be polyvinyl chloride (PVC) or any other suitable conduit material. Each water discharge conduit 34 may have a water discharge conduit inlet end 35 which communicates with the water distribution conduit discharge end 23 of the water distribution conduit 21 and a water discharge conduit discharge end 36 which is opposite the water discharge conduit inlet end 35. In some embodiments, a conduit connector 32, which in some embodiments may be an L-fitting, may connect the water discharge conduit 34 to the water distribution conduit 21. In other embodiments, the water discharge conduit 34 may be cast, molded or otherwise formed in one piece with the water distribution conduit 21 according to techniques which are known by those skilled in the art. As further illustrated in FIG. 5A, a longitudinal axis 58 of the water discharge conduit 34 may be disposed in generally perpendicular relationship with respect to a longitudinal axis 54 of the water distribution conduit 21. An end cap 37 may be provided on the water discharge conduit discharge end 36 of the water discharge conduit 34. A discharge opening 38 (FIG. 2) extends through the end cap 37 and communicates with the water discharge conduit 34.

Figures 3, 4:
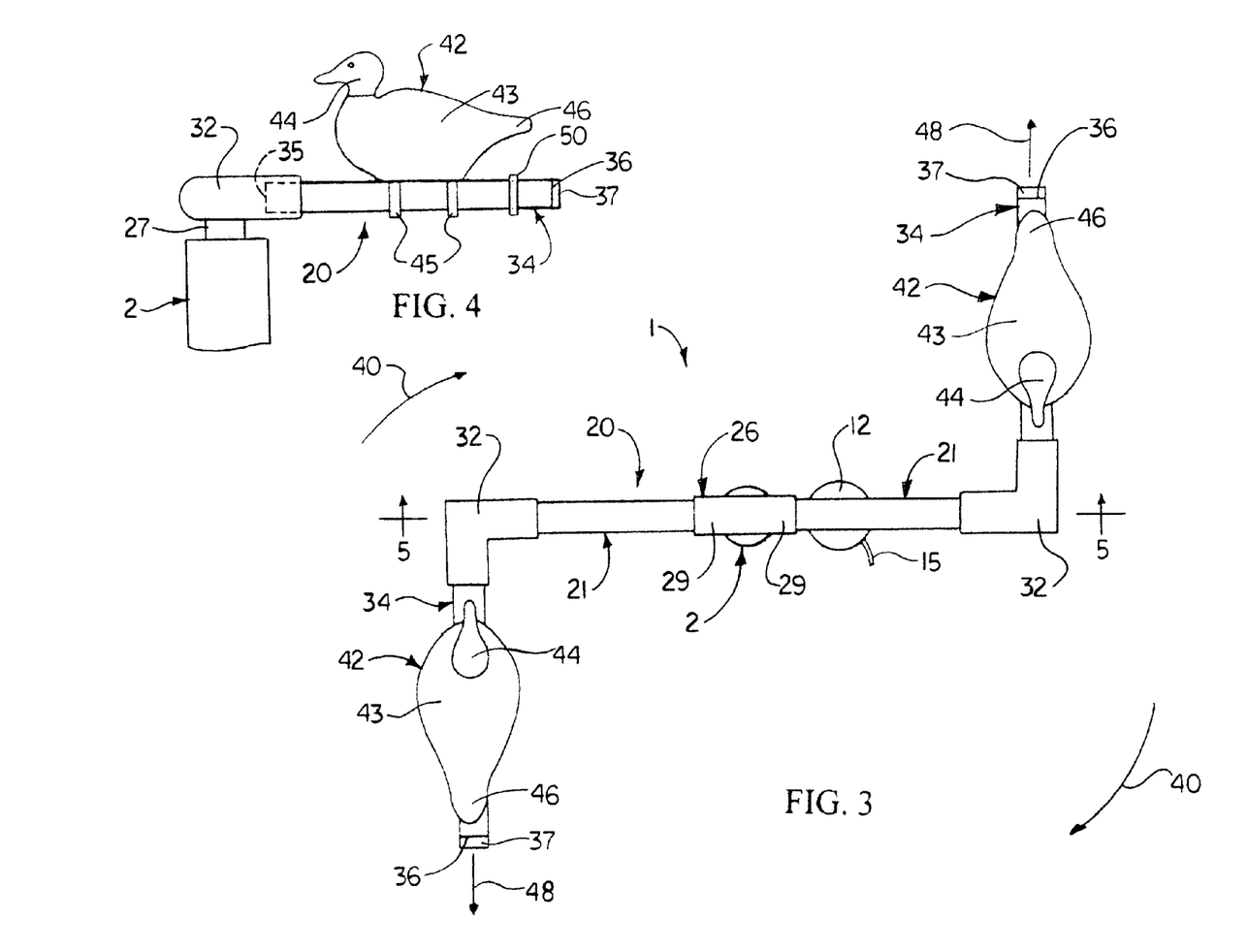
FIG. 3 is a top view of a illustrative embodiment of the simulated fowl swimming apparatus, with arrows indicating typical movement of a decoy motion assembly in exemplary application of the apparatus.
FIG. 4 is a side view, partially in section, of a portion of a decoy motion assembly of an illustrative embodiment of the simulated fowl swimming apparatus, more particularly illustrating an exemplary technique for mounting a water fowl decoy on the decoy motion assembly.

At least one water fowl decoy 42 is provided on each water discharge conduit 34 of the decoy motion assembly 20. Each water fowl decoy 42 may be plastic, STYROFOAM® and/or other buoyant material which simulates the size, color and appearance of a water fowl such as a duck, goose or swine, for example and without limitation. Each water fowl decoy 42 may include a decoy body 43 having a decoy head 44 and a decoy tail 46. Each water fowl decoy 42 may be mounted on the corresponding water discharge conduit 34 of the decoy motion assembly 20 according to any suitable technique which is known by those skilled in the art. As illustrated in FIG. 4, in some embodiments at least one decoy attachment ring 45 may be provided on the decoy body 43 of the water fowl decoy 42. Each decoy attachment ring 45 may be sized to loosely receive the water discharge conduit 34. A retainer ring 50 may be inserted over the water discharge conduit 34 and snapped or secured in place according to the knowledge of those skilled in the art to prevent the decoy attachment rings 45 from inadvertently sliding off the water discharge conduit 34, as is known by those skilled in the art. As further illustrated in FIG. 4, the water fowl decoy 42 may be oriented on the water discharge conduit 34 in such a manner that the decoy head 44 is generally proximate to the water discharge conduit inlet end 35 and the decoy tail 46 is generally proximate to the water discharge conduit discharge end 36 of the water discharge conduit 34. Accordingly, in exemplary application of the simulated fowl swimming apparatus 1, which will be hereinafter further described, the decoy motion assembly 20 of the apparatus 1 is immersed just beneath the surface of a water body 47 (FIGS. 6 and 7) such as a lake or pond, for example and without limitation. Each water fowl decoy 42 floats on the surface of the water body 47 while the decoy attachment rings 45 secure the water fowl decoy 42 to the water discharge conduit 34.

Figures 6, 7:
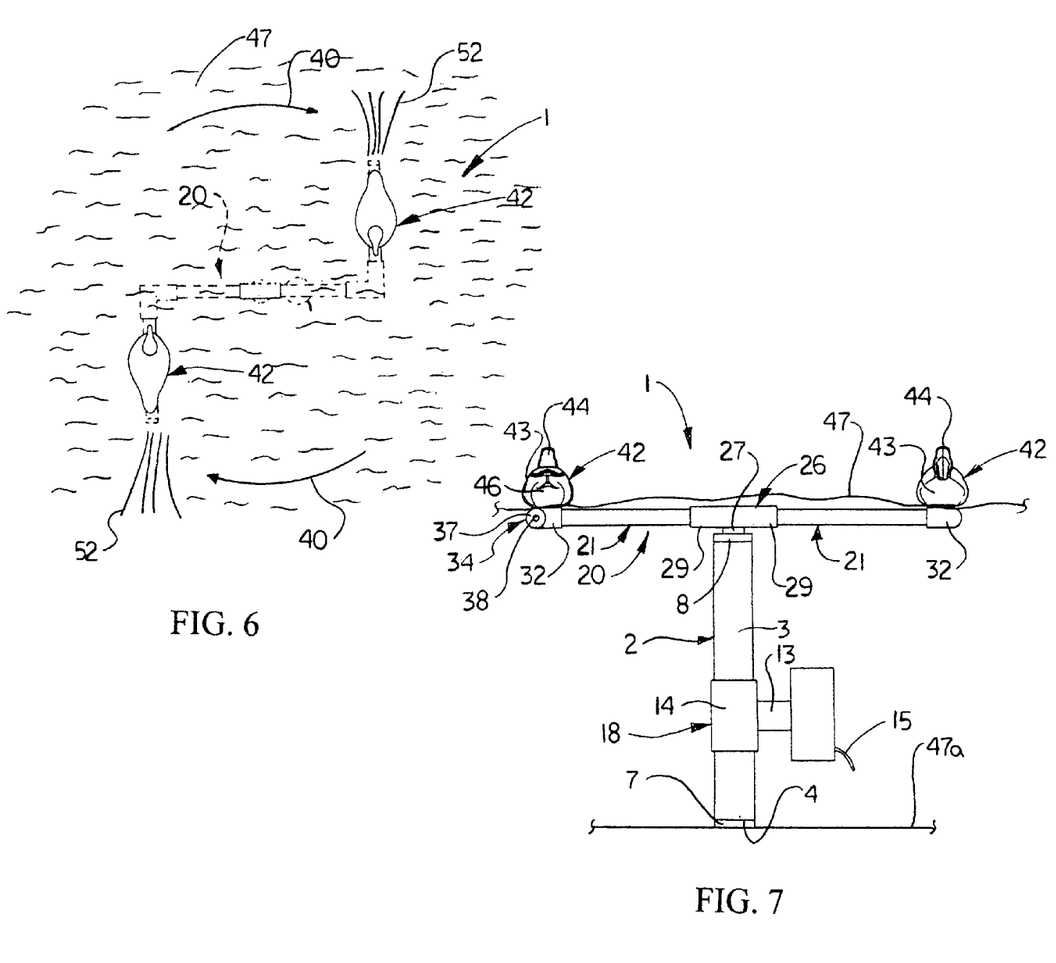
FIG. 6 is a top view of an illustrative embodiment of the simulated fowl swimming apparatus (illustrated in phantom), immersed beneath the surface of a water body and operated to move the water fowl decoys in a circular motion on the surface of the water body in an exemplary application.
FIG. 7 is a front view of an illustrative embodiment of the simulated fowl swimming apparatus, immersed beneath the surface of a water body in an exemplary application.

Referring next to FIGS. 6-8 of the drawings, in an exemplary application of the apparatus 1, the pump conduit 2 is deployed in a vertical orientation in a water body 47 such as a pond or lake, for example and without limitation, in an area to which water fowl (not illustrated) are to be attracted for hunting, observational or other purposes. The pump conduit 2 may be secured to the water body 47 using any suitable technique which is known by those skilled in the art. In some applications, the stake 10 (FIGS. 1 and 2) at the bottom of the pump conduit 2 may be inserted into the water body bottom 47a (FIG. 7) of the water body 47. The area of the water body 47 which is selected for deployment of the apparatus 1 may have a depth which is slightly greater than the height of the apparatus 1 such that the decoy motion assembly 20 of the apparatus 1 is submerged just beneath the surface of the water body 47, as illustrated in FIGS. 6 and 7. Therefore, the water fowl decoy 42 on each water discharge conduit 34 floats on the surface of the water body 47 as the decoy attachment rings 45 (FIG. 4) loosely secure the water fowl decoy 42 on the water discharge conduit 34.

After the apparatus 1 is deployed beneath the surface of the water body 47, the pump motor switch 12b and the battery 16 may be located at a remote position with respect to the decoy motion assembly 20 of the apparatus 1. An operator (not illustrated) of the apparatus 1 may then actuate the bilge pump 12 by appropriate manipulation of the pump motor switch 12b. As illustrated in FIG. 5, the bilge pump 12 pumps water 48 from the water body 47 through the connecting conduit 13 of the connecting conduit 18 and the conduit interior 6 of the pump conduit 2 and the connecting conduit neck 27 of the connecting conduit 26. The water 48 then flows through the water distribution conduits 21 and the water discharge conduits 34, respectively, of the decoy motion assembly 20, and is finally discharged through the discharge opening 38 in the end cap 37 at the water discharge conduit discharge end 36 of the water discharge conduit 34 and into the water body 47. As the water 48 is forcefully discharged from the discharge conduit 34 through the discharge opening 38 in the end cap 37, the jet propulsion effect of the discharged water 48 causes continuous 360° rotation of the decoy motion assembly 20 in the direction indicated by the arrows 40 in FIGS. 3, 5A and 6. In some embodiments, a timer (not illustrated) may be connected to the pump motor 12a for timed operation of the apparatus 1. Accordingly, as illustrated in FIG. 6, the water fowl decoys 42 move in a circular 360° motion on the surface of the water body 47, simulating the swimming movement of actual water fowl on the water body 47. The circular motion of the water fowl decoys 42 on the water body 47 simulates the motion of live water fowl swimming on the water body 47, attracting flying water fowl to the area in which the apparatus 1 is deployed and operated for hunting, observational or other purposes.

It will be appreciated by those skilled in the art that ejection of the water 48 from the water discharge conduits 34, in combination with the forward motion of the water fowl decoys 42 on the surface of the water body 47, results in a trail 52 of water in the water body 47 behind each water fowl decoy 42. The trail 52 simulates and closely approximates the appearance of a trail which is typically formed by a live water fowl as the water fowl swims along the surface of a body of water, thus enhancing the authentic or lifelike appearance of the water fowl decoys 42 as the water fowl decoys 42 move in the circular motion on the surface of the water body 47. The enhanced live action or appearance of the water fowl decoys 42 serves as a strong attractant of flying water fowl to the area in which the apparatus 1 is deployed and operated.

Figure 9:
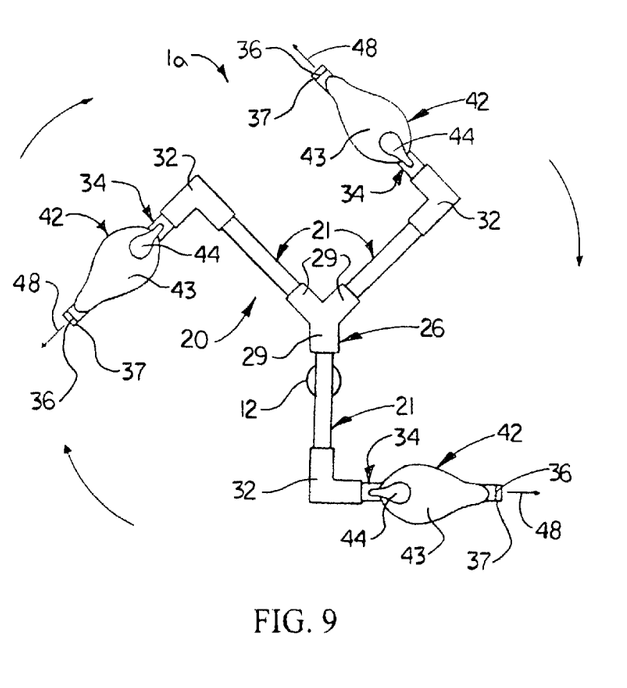
FIG. 9 is a top view of another illustrative embodiment of the simulated fowl swimming apparatus.
Figure 10:
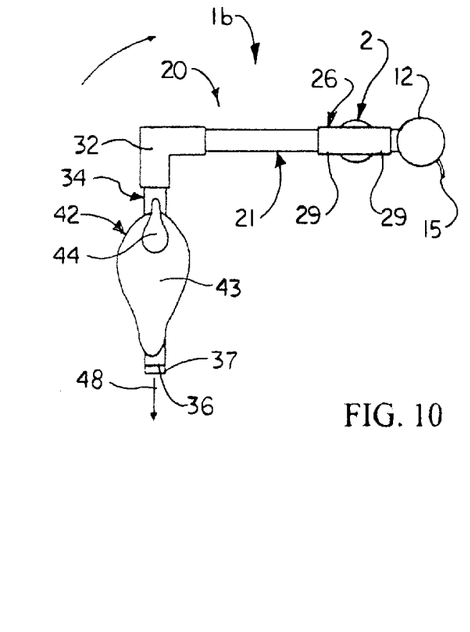
FIG. 10 is a top view of still another illustrative embodiment of the simulated fowl swimming apparatus.
Figure 11:
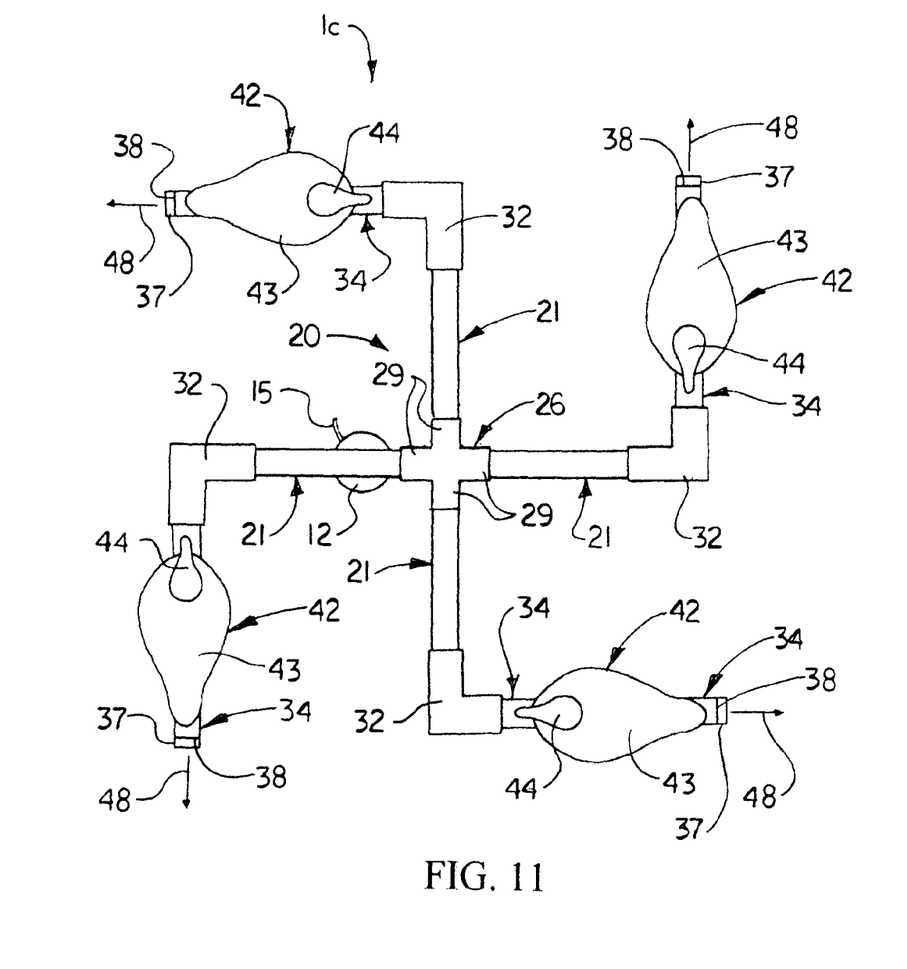
FIG. 11 is a top view of yet another alternative illustrative embodiment of the simulated fowl swimming apparatus.

Referring next to FIGS. 9-11 of the drawings, in some embodiments of the assembly 1, the decoy motion assembly 20 may include a pair of water distribution conduits 21 and a pair of water discharge conduits 34, with a pair of water fowl decoys 42 provided on the respective water discharge conduits 34 as heretofore described with respect to FIGS. 1-7, As illustrated in FIG. 9, in other embodiments of the assembly 1a, the decoy motion assembly 20 may include three water distribution conduits 21 and three water discharge conduits 34 with three water fowl decoys 42, respectively. As illustrated in FIG. 10, in still other embodiments of the assembly 1b, the decoy motion assembly 20 may include a single water distribution conduit 21 and a single water discharge conduit 34 with a single water fowl decoy 42. As illustrated in FIG. 11, in other embodiments of the assembly 1c, the decoy motion assembly 20 may have four water distribution conduits 21 and four water discharge conduits 34 with our water fowl decoys 42, respectively. In other embodiments of the assembly, a decoy motion assembly 20 having additional water distribution conduits 21, water discharge conduits 34 and water fowl decoys 42, respectively, may be contemplated.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A simulated fowl swimming apparatus, comprising:
    a pump conduit having a lower conduit end and an upper conduit end;
    a pump disposed in fluid communication with said pump conduit between said lower conduit end and said upper conduit end;
    a stake extending downwardly from said lower conduit end of said pump conduit:
    a decoy motion assembly including:
        at least one water distribution conduit disposed in fluid communication with and rotatable with respect to said upper conduit end of said pump conduit, said water distribution conduit perpendicular to said pump conduit;
        at least one water discharge conduit disposed in fluid communication with said water distribution conduit, said water discharge conduit perpendicular to said water distribution conduit;
        at least one discharge opening in said water discharge conduit; and
        at least one water fowl decoy carried by said at least one water discharge conduit; and
    wherein said water discharge conduit is driven in a circular motion via jet propulsion and said water distribution conduit rotates about said pump conduit and constrains said at least one water fowl decoy in a circular path having a diameter corresponding to a radius of said water distribution conduit with said pump conduit centered in said circular path as water is pumped through said pump conduit and said decoy motion assembly and is discharged from said at least one discharge opening, respectively, responsive to operation of said pump.

2. The apparatus of claim 1 wherein said pump conduit comprises a generally elongated, cylindrical conduit wall.

3. The apparatus of claim 1 wherein said at least one water distribution conduit comprises a plurality of water distribution conduits; said at least one water discharge conduit comprises a plurality of water discharge conduits disposed in fluid communication with said plurality of water distribution conduits, respectively; and said at least one water fowl decoy comprises a plurality of water fowl decoys carried by said plurality of water discharge conduits, respectively.

4. The apparatus of claim 3 wherein said plurality of water distribution conduits, said plurality of water discharge conduits and said plurality of water fowl decoys comprises at least three water distribution conduits, at least three water discharge conduits and at least three water fowl decoys.

5. The apparatus of claim 4 wherein said at least three water distribution conduits, said at least three water discharge conduits and said at least three water fowl decoys comprises at least four water distribution conduits, at least four water discharge conduits and at least four water fowl decoys.

6. A simulated fowl swimming apparatus, comprising:
a pump conduit having a lower conduit end and an upper conduit end;
a submersible pump disposed in fluid communication with said pump conduit between said lower conduit end and said upper conduit end;
a stake extending downwardly from said lower conduit end of said pump conduit;
a bushing carried by said upper conduit end of said pump conduit; and
a decoy motion assembly including:
a connecting conduit disposed in fluid communication with said pump conduit and having a connecting conduit neck journaled for rotation in said bushing and a connecting conduit arm communicating with and perpendicular to said connecting conduit neck;
at least one water distribution conduit having a water distribution conduit inlet end proximate to and disposed in fluid communication with said connecting conduit arm of said connecting conduit and a water distribution conduit discharge end opposite said water distribution conduit inlet end, said water distribution conduit perpendicular to said pump conduit;
at least one water discharge conduit having a water discharge conduit inlet end proximate to and disposed in fluid communication with said water distribution conduit discharge end of said at least one water distribution conduit and a water discharge conduit discharge end opposite said water discharge conduit inlet end, said water discharge conduit perpendicular to said water distribution conduit and said water distribution conduit and said water discharge conduit disposed in a common plane perpendicular to said pump conduit;
at least one discharge opening at said water discharge conduit discharge end of said at least one water discharge conduit; and
at least one water fowl decoy carried by said water discharge conduit; and
wherein said water discharge conduit is driven in a circular motion via jet propulsion and said connecting conduit rotates in said bushing about said pump conduit and said water distribution conduit constrains said at least one water fowl decoy in a circular path having a diameter corresponding to a radius of said water distribution conduit with said pump conduit centered in said circular path as water is pumped through said pump conduit and said decoy motion assembly and is discharged from said at least one discharge opening, respectively, responsive to operation of said pump.

7. The apparatus of claim 6 wherein said pump conduit comprises a generally elongated, cylindrical conduit wall.

8. The apparatus of claim 6 wherein said at least one water distribution conduit comprises a plurality of water distribution conduits; said at least one water discharge conduit comprises a plurality of water discharge conduits disposed in fluid communication with said plurality of water distribution conduits, respectively; and said at least one water fowl decoy comprises a plurality of water fowl decoys carried by said plurality of water discharge conduits, respectively.

9. The apparatus of claim 6 wherein said at least one water distribution conduit comprises a plurality of water distribution conduits; said at least one water discharge conduit comprises a plurality of water discharge conduits disposed in fluid communication with said plurality of water distribution conduits, respectively; and said at least one water fowl decoy comprises a plurality of water fowl decoys carried by said plurality of water discharge conduits, respectively.

10. The apparatus of claim 9 wherein said plurality of water distribution conduits, said plurality of water discharge conduits and said plurality of water fowl decoys comprises at least three water distribution conduits, at least three water discharge conduits and at least three water fowl decoys.

11. The apparatus of claim 10 wherein said at least three water distribution conduits, said at least three water discharge conduits and said at least three water fowl decoys comprises at least four water distribution conduits, at least four water discharge conduits and at least four water fowl decoys.

12. A simulated fowl swimming apparatus, comprising:
a pump conduit having a generally elongated, cylindrical conduit wall and a lower conduit end and an upper conduit end opposite said lower conduit end;
a connecting conduit sleeve on said pump conduit between said lower conduit end and said upper conduit end of said pump conduit;
a pump connecting conduit disposed in fluid communication with said connecting conduit sleeve;
a submersible bilge pump disposed in fluid communication with said pump connecting conduit;
a stake having a stake tip extending downwardly from said lower conduit end of said pump conduit;
a bushing carried by said upper conduit end of said pump conduit; and
a decoy motion assembly including:
a connecting conduit disposed in fluid communication with said pump conduit and having a connecting conduit neck journaled for rotation in said bushing and a connecting conduit arm communicating with and perpendicular to said connecting conduit neck;
at least one water distribution conduit having a water distribution conduit inlet end proximate to and disposed in fluid communication with said connecting conduit arm of said connecting conduit and a water distribution conduit discharge end opposite said water distribution conduit inlet end, said water distribution conduit perpendicular to said pump conduit;
at least one water discharge conduit having a water discharge conduit inlet end proximate to and disposed in fluid communication with said water distribution conduit discharge end of said at least one water distribution conduit and a water discharge conduit discharge end opposite said water discharge conduit inlet end, said water discharge conduit perpendicular to said water distribution conduit and said water distribution conduit and said water distribution conduit and said water discharge conduit disposed in a common plane perpendicular to said pump conduit;

at least one discharge opening at said water discharge conduit discharge end of said at least one water discharge conduit; and at least one water fowl decoy carried by said water discharge conduit; and wherein said water discharge conduit is driven in a circular motion via jet propulsion and said connecting conduit rotates in said bushing about said pump conduit and said water distribution conduit constrains said at least one water fowl decoy in a circular path having a diameter corresponding to a radius of said water distribution conduit with said pump conduit centered in said circular path as water is pumped through said pump conduit and said decoy motion assembly and is discharged from said at least one discharge opening, respectively, responsive to operation of said pump.

13. The apparatus of claim 12 wherein said at least one water distribution conduit comprises a plurality of water distribution conduits; said at least one water discharge conduit comprises a plurality of water discharge conduits disposed in fluid communication with said plurality of water distribution conduits, respectively; and said at least one water fowl decoy comprises a plurality of water fowl decoys carried by said plurality of water discharge conduits, respectively.

14. The apparatus of claim 12 further comprising at least one decoy attachment ring carried by said at least one water fowl decoy and receiving said at least one water discharge conduit.

* * * * *